(12) United States Patent
Fellinger

(10) Patent No.: US 9,180,645 B2
(45) Date of Patent: Nov. 10, 2015

(54) SELF-STICK INSULATION AND METHODS

(71) Applicant: JOHNS MANVILLE, Denver, CO (US)

(72) Inventor: Thomas John Fellinger, Littleton, CO (US)

(73) Assignee: John Manville, Denver, CO (US)

( * ) Notice: Subject to any disclaimer, the term of this patent is extended or adjusted under 35 U.S.C. 154(b) by 196 days.

(21) Appl. No.: 13/692,293

(22) Filed: Dec. 3, 2012

(65) Prior Publication Data

US 2014/0154478 A1    Jun. 5, 2014

(51) Int. Cl.
*B32B 3/10* (2006.01)
*C09J 7/02* (2006.01)
*C09J 7/04* (2006.01)
*E04B 1/76* (2006.01)
*F24F 13/02* (2006.01)

(52) U.S. Cl.
CPC ............... *B32B 3/10* (2013.01); *C09J 7/0239* (2013.01); *C09J 7/041* (2013.01); *E04B 1/767* (2013.01); *C09J 2201/28* (2013.01); *C09J 2201/614* (2013.01); *C09J 2400/263* (2013.01); *F24F 13/0263* (2013.01); *Y10T 428/24802* (2015.01); *Y10T 428/283* (2015.01)

(58) Field of Classification Search
CPC ............ B23B 3/10; B05D 5/10; C09J 7/042; C09J 2201/28; C09J 2201/614
USPC ............ 427/207.1, 516, 177; 428/195.1, 350; 156/71
See application file for complete search history.

(56) References Cited

U.S. PATENT DOCUMENTS 4,910,048 A * 3/1990 Sinclair ...................... 427/208.6
5,104,701 A * 4/1992 Cohen et al. ................. 428/34.5

* cited by examiner

*Primary Examiner* — Xiao Zhao
(74) *Attorney, Agent, or Firm* — Robert D. Touslee

(57) ABSTRACT

According to one embodiment, a self-adhesive insulation product is provided. The self-adhesive insulation product includes an elongated fibrous insulation blanket having a length, a width, a thickness, and a first major surface and a second major surface which each extend for the length and width of the fibrous insulation blanket. The self-adhesive insulation product also includes a coating of an adhesive applied to the first major surface of the fibrous insulation blanket. The adhesive includes an emulsion of a polymer material and water with the water evaporated so that the adhesive forms a dry layer atop the first major surface. The adhesive is nonbondable or nonadherable to other objects when in the dry state and is bondable or adherable to other objects upon the subsequent application of water.

18 Claims, 4 Drawing Sheets

SELF-STICK INSULATION AND METHODS

BACKGROUND OF THE INVENTION

Pre-formed insulation products (batts, blankets, boards, etc.) are applied to various structures and equipment using a variety of fastening techniques. For example, in wood framed wall applications, faced batt insulation are typically stapled to the perimeter framing members of each cavity via a stapling flange on the facing. Similarly, un-faced batt insulation used for framed walls (wood or steel stud) is typically held in place with a friction fit. For crawl spaces, lightning rods or other mechanical fastening devices are typically used to hold the insulation in place. Foam boards are generally glued to framing members and/or fastened with nails or other fasteners.

Application of insulation to HVAC equipment and appliances is typically accomplished with the use of adhesives or fastening clips. The adhesives are generally applied immediately prior to the insulation being installed in the HVAC equipment and/or other appliances. A variety of adhesives may be used for this purpose including: solvent based products, hot melts, pressure sensitive adhesives, water-based adhesives, and the like. Some of these processes use volatile organic compounds (VOC) based solvents that require personal protective equipment (PPE) and/or ventilation during application.

BRIEF SUMMARY OF THE INVENTION

Embodiments of the invention provide insulation blankets and other insulation products that are "self-adhesive", or in other words that do not require an adhesive or glue to be applied to the products immediately before installing the products. According to one aspect, a method of making a self-adhesive insulation blanket is provided. The method includes providing an elongated fibrous insulation blanket or board product. The fibrous insulation blanket or board product has a length, a width, a thickness, and a first major surface and a second major surface which each extend for the length and width of the fibrous insulation blanket or board product. The method also includes applying an adhesive to the first major surface of the fibrous insulation blanket or board product. The adhesive is or includes an emulsion of a polymer material and water. The method further includes passing the fibrous insulation blanket or board product through an oven to evaporate the water of the adhesive. After passing through the oven, the adhesive forms a dry layer atop the first major surface. The adhesive forms a polymer matrix atop the first major surface, which is nonadherable or nonbondable to other objects when in the dry state and re-adherable or bondable to other objects upon a subsequent application of water. The method may additionally include rolling the fibrous insulation blanket or board product to form a blanket roll product.

According to another aspect, a method of making a self-adhesive insulation product is provided. The method includes providing a fibrous insulation blanket or board product. The fibrous insulation blanket or board product has a length, a width, a thickness, a first major surface and a second major surface which each extend for the length and width of the fibrous insulation blanket or board product, and a facer coupled with the first major surface. The facer has a length approximately equal to the length of the fibrous insulation blanket or board product and a width that is greater than the width of the insulation blanket or board product so as to form flanges on opposing sides of the fibrous insulation blanket or board product when coupled with the first major surface. The method also includes applying an adhesive to the flanges of the facer. The adhesive is or includes an emulsion of a polymer material and water. The method further includes passing the fibrous insulation blanket or board product and facer through an oven to evaporate the water of the adhesive applied to the flanges. Evaporation of the water causes the adhesive to form a dry layer atop a surface of each flange. The adhesive is nonadherable or nonbondable to other objects when in the dry state and re-adherable or bondable to other objects upon an application of water. The method may additionally include rolling the fibrous insulation blanket or board product and facer to form a rolled insulation product.

According to another aspect, a self-adhesive insulation product is provided. The self-adhesive insulation product includes an elongated fibrous insulation blanket or board product having a length, a width, a thickness, and a first major surface and a second major surface which each extend for the length and width of the fibrous insulation blanket or board product. The self-adhesive insulation product also includes a coating of an adhesive applied to the first major surface of the fibrous insulation blanket or board product. The adhesive is or includes an emulsion of a polymer material and water with the water evaporated so that the adhesive forms a dry layer atop the first major surface. The adhesive is nonbondable or nonadherable to other objects when in the dry state and bondable or adherable to other objects upon a subsequent application of water.

BRIEF DESCRIPTION OF THE DRAWINGS

The present invention is described in conjunction with the appended figures.

Figure 1:
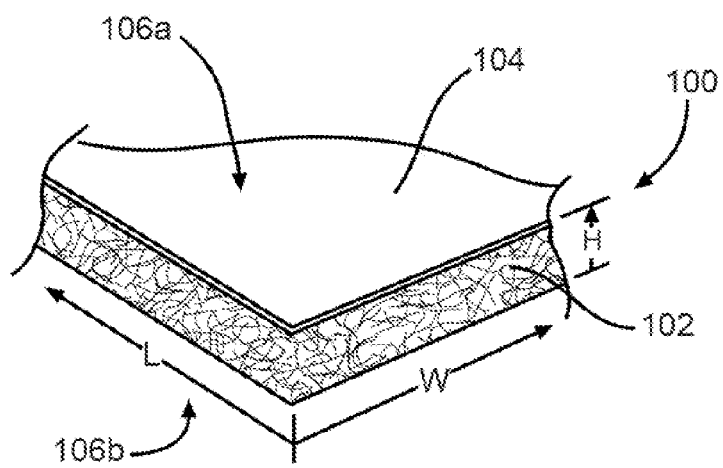
FIG. 1 illustrates a perspective view of an insulation product according to an embodiment of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the invention provide insulation blankets and other insulation products that are "self-adhesive." The term self-adhesive as used herein refers to the insulation products ability to bond or adhere to an object without the need to apply an adhesive or glue immediately before pressing the insulation product on the object for which bonding is intended. The term self-adhesive need not imply that an adhesive or glue is not used to adhere the insulation product, but rather, that a user need not apply the adhesive immediately before installation. Because the user is not required to apply the adhesive immediately before installation, the user is not exposed to various chemicals and the installation time is greatly reduced.

The embodiments described herein are generally referred to as insulation products, fibrous insulation blankets, insulation board products, board products, and the like. These terms are used merely for convenience in describing the embodiments and are not meant to limit the invention to any one type of insulation product unless indicated. These terms may include any insulation type products, which could be made of various fibers, foams, and the like. Common types of insulation product that are contemplated herein include fiberglass, mineral wool, slag wool, rock wool, foam or other insulation boards, and the like, which may be faced or unfaced as desired. The terms insulation products, fibrous insulation blankets, and the like, include these and other insulation products. The embodiments here also use the word "re-adherable" or "rebondable" to describe how water may be applied to a dried adhesive to allow the adhesive to bond, adhere, or couple with another object. The terms "re-adherable" or "rebondable" describe how the dried adhesive becomes tacky and may be subsequently glued to another object.

According to some embodiments, the self-adhesive function of the insulation product is achieved by water activating a dry adhesive film or coating on the insulation product's surface and/or on an attachment flange formed from a facing material attached to the insulation product. The thin film or coating of the dry adhesive on the insulation or flange may be moistened with a fine water mist with a sprayer, sponge, and the like, and allowed a few seconds to change phase from a sold to a gel or viscous liquid. The insulation product can then be placed and pressed in position, held for several seconds, and released. After the moistened adhesive gel or liquid dries, a good bond will form between the insulation product and the application surface. In some embodiments, the surface intended for the insulation product (e.g., a wall) may be wet with a sponge or sprayer and then the insulation product positioned and pressed against the wall for a few seconds to allow the adhesive to change phase from the sold to the gel or viscous liquid and partially re-dry.

In some embodiments, the adhesive may be a water-based adhesive glue, which may include vegetable glues, resin cements, animal/protein glues, and/or latex cements. In a specific embodiment, the adhesive may be an emulsion of one or more polymers and/or elastomers and water. For example, the adhesive may be a fast drying Polyvinyl Acetate (PVA) type material, ethelyne vinyl acetate (EVA), and the like.

According to some embodiments, the adhesive may be applied to a surface of the insulation product by spraying the adhesive onto the surface and/or onto a flange of the insulation product via a spray header and pump assembly. The application of the adhesive may occur during an insulation manufacturing process or by a secondary fabricator. The applied adhesive forms a thin film or coating of adhesive on the insulation surface. In another embodiment, the adhesive can be applied using an adhesive filled trough and pulling the insulation mat through the trough at a controlled speed and height above the trough to form a film coating or layer on the insulation product's surface.

The wet adhesive film, layer, or coating may then be dried via a curing oven, infrared oven, or some other heat source before the insulation product is further processed and packaged, such as by rolling the insulation product for shipment to another facility. In some embodiments, the dry adhesive coated insulation product may then be shipped to in weather tight packaging so as to avoid moisture ingress, which could potentially activate the adhesive during shipment and/or storage.

In some embodiments, a facer material may be coupled with the insulation product. The facer material may be a paperboard or cardboard material (e.g., kraft paper), foil, scrim, polymer material, and the like, or any combination thereof (e.g., foil, scrim, kraft (FSK)). In some embodiments, the insulation product may be transported to a separate facility after the adhesive is applied and dried. The separate facility may then unroll the rolled insulation product and bond the facer material therewith. The facility may also cut the insulation product to a desired size and ship the insulation product for subsequent installation.

Installers at the installation site would then wet the dry adhesive layer or coating and apply the insulation product to one or more objects. In this manner, the installers are not required to handle any glues or adhesive in installing the insulation product, nor are the installers exposed to any volatile organic compounds (VOCS). Further, the installers are not required to buy and store the adhesive glues and chemicals. Rather, the installers simply need a water application device, such as a sprayer, sponge, and the like.

In some embodiments, the insulation product may be applied to ducts or other components of a Heating, Ventilation, and Air Conditioning (HVAC) system. In such embodiments, the insulation product may be adhered directly to sheet metal. In another embodiment, the insulation product may be installed between studs or joints (metal or wood and the like) of a building or home. In yet another embodiment, the insulation product may be adhered to garage door panels to insulate a home or building's garage. In such embodiments, the insulation product adheres to wood, metal, and or other materials. The insulation product is able to adhere to such materials without requiring the use of clips, pins, staples, and the like, which are typically used in conventional systems.

When the dry adhesive layer or coating is wetted and pressed against an object, the adhesive may have a "working time" or tack time in which the installer is able to adjust the position of the insulation product relative to the object. Stated differently, the adhesive may have a period of time before it fully, or significantly, sets up and the insulation product is firmly held in place. The adhesive's working time allows the installer to move or shift, or even remove, the insulation product in case of misalignment, improper installation, and the like.

In some embodiments, the adhesive's working or tack time may be about 3 minutes or less, 2 minutes or less, about 1 minute or less from the application of water and/or after the insulation product is initially installed. In one embodiment, the adhesive's working time may range from between 30 seconds to 1.5 minutes or 30 seconds to 1 minute. The adhesive may quickly form a tacky gel or viscous liquid after water is applied. In some embodiments, it may take 15 seconds or less, 10 seconds or less, 5 seconds or less, and the like for the dry adhesive to form the gel or viscous liquid that is re-adherable to other objects. In a specific embodiment, the adhesive may become tacky within 4-8 seconds to the point that the insulation product may be applied to an object's surface and remain in place. In some embodiments, the adhesive may set up or dry in 30 minutes or less, 20 minutes or less, 15 minutes or less, and the like.

In some embodiments, the adhesive may become sufficiently tacky upon an application of as little as 10% or 20% water by weight of the insulation product. In another embodiment, the adhesive may become sufficiently tacky upon an application of water between about 10% and 30% by weight of the insulation product. This range allows the adhesive to become tacky without becoming overly fluid and/or without saturating the insulation product with water and thereby increasing the weight that must be supported by the adhesive. As described herein, the water may be applied by spraying a fine mist over the dry adhesive layer, film, or coating, or by applying the water with a sponge. Although the adhesive is reactivated upon the application of water, the adhesive may remain in a nonadherable or nonbondable state even when subjected to high humidity and high heat condition. For example, the adhesive may remain in the nonadherable or nonbondable state even when subjected to a relative humidity as high as 90% or more and a temperature of 100 degrees Fahrenheit or more. As such, the insulation product may be shipped to and installed in areas of high heat and humidity without negatively affecting the insulation product's performance.

In one embodiment, a PVA adhesive was applied to a ½ inch thick by 4 ft. wide by 50 ft long mat of fiber glass insulation and allowed to dry. The mat was then tightly rolled up and placed in a perforated plastic bag. The roll was then placed in a humidity chamber and subjected to temperature and humidity conditions of 90% relative humidity and 90 degrees Fahrenheit for three months. The roll was subsequently removed from the humidity chamber and unrolled with no evidence of adhesive reactivation.

In some embodiments, the adhesive may be added to the insulation product so that the dry adhesive layer, film, or coating comprise between 2% and 8% by weight of the insulation product. In other embodiments, the dry adhesive layer, film, or coating may comprise between 3% and 6%, between 3% and 4%, and the like by weight of the insulation product. In some embodiments, and as described more fully herein below, the adhesive may be applied to the insulation product so as to form a non-continuous and/or non-uniform layer, film, or coating atop the insulation product's surface. In other embodiments, the adhesive material may be applied to the insulation product's surface in a patterned arrangement (e.g., S-pattern, parallel or crossing lines, honeycomb pattern, dot pattern, splat pattern, and the like).

Although the embodiments described herein refer to the use of water based adhesives, in other embodiments the insulation product may use non-water based adhesives that may be reactivated upon the performance of some operation. For example, a hot melt adhesive could be applied to the insulation product and allowed to cool and dry. During the installation process, an installer could reheat the hot melt to soften the adhesive and allow the insulation product to be pressed and adhered to a surface. A hot melt adhesive typically requires high heat (e.g., about 300 degrees to 350 degrees Fahrenheit) to sufficiently re-soften, which may render this process slightly less desirable.

Referring now to FIG. 1, illustrated is an insulation product 100 comprising an elongated fibrous insulation blanket 102 and a facer material 104 coupled therewith. The fibrous insulation blanket 102 has a length L, a width W, and a thickness H. The fibrous insulation blanket 102 also includes a first major surface 106b and a second major surface 106a, which typically extend for the length and width of the fibrous insulation blanket 102. As shown below and described herein, a coating, film, or layer of the adhesive may be applied to the first major surface 106b of fibrous insulation blanket 102. In one embodiment, the adhesive may include an emulsion of a polymer material and water. The water may be evaporated so that the adhesive forms a dry layer, film, or coating atop the first major surface 106b. The adhesive is nonbondable or nonadherable to other objects when in the dry state. Upon the subsequent application of water, the adhesive becomes bondable or adherable to other objections. The facer material 104 may be any material, such as those described herein.

Figure 2:
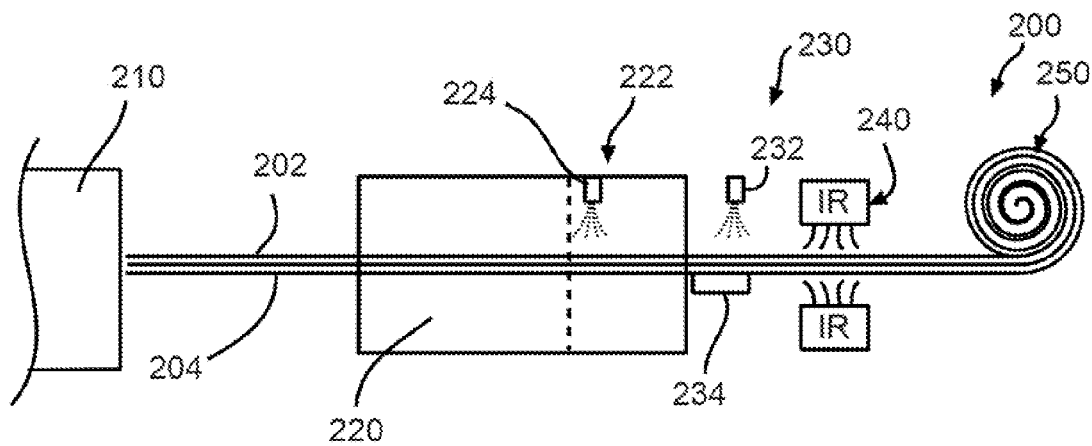
FIG. 2 illustrates a system for making a self-stick insulation product according to an embodiment of the invention.

Referring now to FIG. 2, illustrated is a diagram of a system 200 for forming a self-adhesive insulation product. According to system 200, the adhesive layer, film, or coating 200 may be applied to the insulation product 202 as part of an insulation product manufacturing process. As shown, the insulation product 202 may be conveyed through the process via a belt 204. In one embodiment, insulation product 202 may be an elongated fiberglass blanket (hereinafter fiberglass 202). The fiberglass 202 may be made or formed at a first processing station 210.

To form the fiberglass 202 blanket, sand and other agents (e.g., fluxing agents, anti-bubbling agents, and the like) may be mixed in a batch. The batch may be heated to melt the materials and form glass. The glass may then be run through openings in a plate (e.g., through platinum orifices) to form a controlled diameter glass stream. The glass may be allowed to cool and subsequently spun via "spinners" or disks having laser drilled holes. The spinners may be spun to tangential force the glass outward into fine fibers. The fine glass fibers may be collected on belt 204 positioned at the bottom of a box. A vacuum may be used to suck the fine fibers down onto a flat horizontal surface of belt 204. The fine fibers may collect on the belt 204 to form a fiberglass mat 202. The thickness and/or density of the fiberglass mat 202 may be controlled by controlling the speed of the belt 204 through the box—i.e., slower speeds typically result in thicker and/or more dense mats while quicker speeds typically result in thinner and less dense mats.

A binder is typically sprayed or otherwise applied to the fibers prior to, or after, the fibers collect on belt 204. For example, the binder may be sprayed onto the fibers shortly after they exit the spinners via sprayers that angle downward from the spinners toward the belt 204. The binder typically bonds the fibers at a point of contact after the binder is cured. The fiberglass mat 202 and binder are conveyed via belt 204 to curing oven 220 where the binder is cured to couple the fine fibers together.

In some embodiments, the self-stick adhesives described herein (e.g., the water based adhesive) may be applied during the above described manufacturing process. For example, in some embodiments, a distal portion 222 of curing oven 220 may be configured to include spray jets 224 that spray the adhesive onto a top or major surface of the fiberglass mat 202 as the mat is conveyed through the oven. The spray jets 224 may be positioned in the distal portion 222 of oven 220 so that the adhesive is not exposed to the entire oven 220 process and/or temperature, but is rather only exposed to the distal oven portion and temperature. In some embodiments, the adhesive may be prone to degradation if a temperature exceeds about 350 degrees Fahrenheit. In such embodiments, the distal portion 222 of oven 220 may be configured so as not to exceed this temperature, or the adhesive may only be exposed for a time sufficient to evaporate the water without exceeding this temperature.

In another embodiment, the spray jets 224 may be positioned near a proximal portion of the oven 220 and additional water added to the adhesive emulsion, or the polymer chemistry altered, so that exposure to the entire oven process does not significantly degrade the adhesive. The additional water may function as a buffer to the increased heat and/or exposure time. Regardless of the process, upon exiting the oven 220, the water of the adhesive may be evaporated so that the adhesive forms the dry layer, film, or coating described herein. In yet another embodiment, the adhesive may be heated to near the boiling point of water before being applied to the fiberglass mat so as to facilitate quick evaporation of the water from the adhesive.

In another embodiment, an adhesive application station 230 may be positioned distally of oven 220 to apply the adhesive. For example, spray jets 232 may be positioned distally of the oven 220 to apply the adhesive. Alternatively or additionally, a trough 234, which is filled with the adhesive, may be positioned below belt 204. Fiberglass mat 202 may be pulled through trough 234 at a controlled speed and height above the trough 234 to form a film, layer, or coating on the fiberglass mat's surface. After application of the adhesive via spray jets 232 and/or trough 234, the fiberglass mat 202 may pass through another oven, such as an infrared oven 240 or another type of oven, to evaporate the water and form the dry layer, coating, or film on the fiberglass mat's surface.

In some embodiments, the fiberglass mat 202 having the dry adhesive film, layer, or coating may be conveyed to a finishing station 250, where the fiberglass mat 202 may optionally be rolled for subsequent shipping. In other embodiments, the fiberglass mat 202 need not be rolled, but may be cut to size, stacked, and the like. The fiberglass mat 202 roll may be shipped to another facility where a facer is optionally coupled with the fiberglass mat and/or where the finished product is installed.

Although the adhesive is generally described as being applied during the mat manufacturing process, in other embodiments the adhesive may be applied subsequent to the manufacturing process. This subsequent application of the adhesive may occur at the manufacturing facility or at a different facility as desired.

Figure 3A:
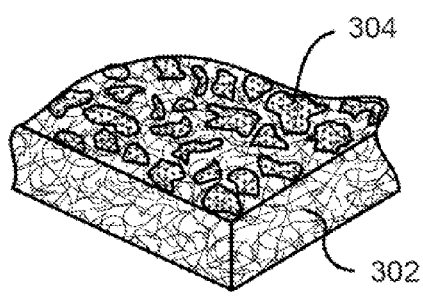
FIGS. 3a-d illustrate various patterns that may be used in applying an adhesive atop a surface of an insulation product according to embodiments of the invention.

Referring now to FIGS. 3a-d, illustrated are various embodiments showing how the adhesive may be applied to a surface of the insulation product. For example, as shown in FIG. 3a, the adhesive may be applied to a surface of the insulation product 302 so as to form a non-continuous and/or non-uniform coating, film, or layer atop the insulation product 302. The description of "non-continuous" means that the coating, layer, or film is not a single or solid (i.e., essentially unbroken) coating, layer, or film. The description of "non-uniform" means that the pattern of the coating, layer, or film is random. A potential advantage of a non-continuous and/or non-uniform coating, layer, or film is that less adhesive material is required while providing sufficient adhesion or bonding to a surface. In other embodiments, a continuous and/or uniform coating, layer, or film of the adhesive may be applied to the insulation product as desired. In some embodiments, the adhesive film, layer, or coating may be about 0.010 to 0.020 inches thick.

Figure 3B:
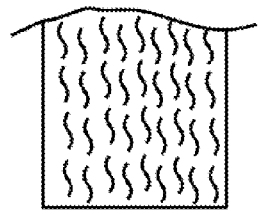
Figure 3C:
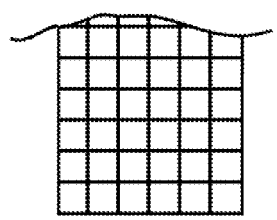
Figure 3D:
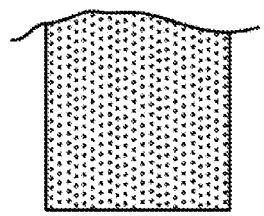

FIGS. 3b-d illustrate various patterns that may be used to apply the adhesive atop the insulation product's surface. As shown in FIG. 3b, in some embodiments a plurality of way lines (e.g., an S shaped pattern) may be used in applying the adhesive. FIG. 3c illustrates that a series of parallel and/or crisscrossing straight lines may be used in applying the adhesive. FIG. 3d illustrates that a repeating dot pattern, or an irregular splat pattern, may be used in applying the adhesive. In yet other embodiments, additional patterns that are not shown (e.g., honeycomb pattern and the like) may be used in applying the adhesive. An advantage of using such patterns is that the adhesive may dry quicker and less adhesive material need be used.

Figure 4:
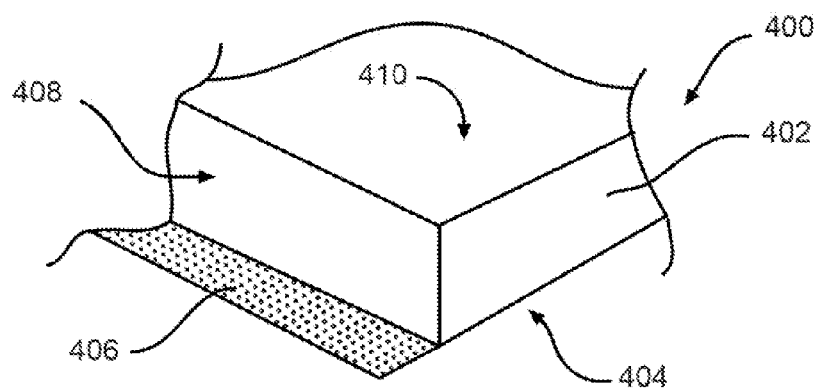
FIG. 4 illustrates a perspective view of another insulation product according to an embodiment of the invention.

Referring now to FIG. 4, illustrated is another embodiment of an insulation product 400. Insulation product 400 may be similar to any of the insulation products described herein. Insulation product 400, however, includes a facer 404 that is wider than the width of the insulation product 400 so that a flange 406 is formed on a side of the insulation product 400. Typically, insulation product 400 includes another flange (not shown) positioned on an opposite side of flange 406. The flanges 406 may extend from the insulation product 400 by about 1-2 inches or more.

The self-stick adhesive material described herein may be applied to one or both flanges 406 of insulation product 400 and dried so that one or both flanges includes a layer, coating, or film of the adhesive material. This allows the flange 406 to be wetted and pressed against an object surface to adhere or bond the insulation product 400 to the object. In some embodiments, one or more sides 408 and/or the top surface 410 of the insulation product 400 may also be coated or layered with the self-stick adhesive to allow these portions of the insulation product 400 to also adhere or bond with the object's surface. In some embodiments, the entire surface of the facer 404, or a substantial portion thereof, may be coated with the self-stick adhesive prior to coupling the facer 404 with the insulation product 400. The adhesive may bond the facer 404 to the insulation product 400 in addition to providing the wetable flange portion that is adherable or bondable to other objects.

Figure 5A:
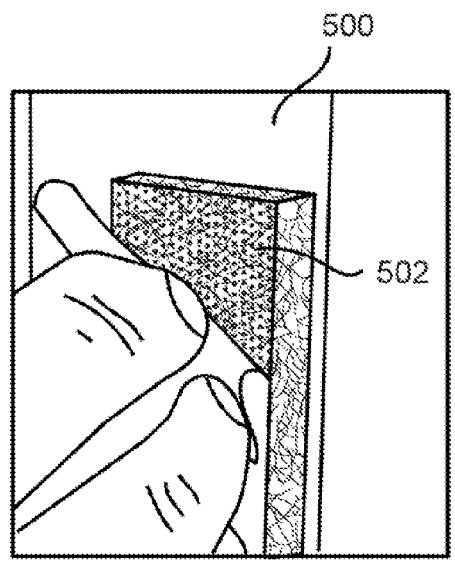
FIGS. 5a-c illustrate various applications of an insulation product according to embodiments of the invention.
Figure 5B:
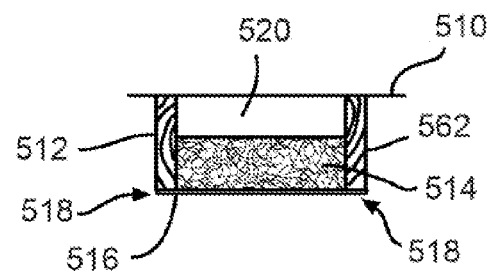
Figure 5C:
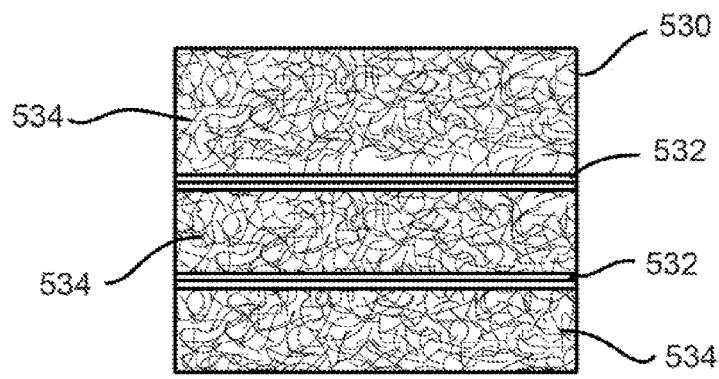

Referring now to FIGS. 5a-c, illustrated are various applications of the self-stick insulation products. FIG. 5a illustrates an insulation product 502 bonded or adhered to a surface 500 of an object. The insulation product 502 is bonded or adhered to the surface 500 by wetting the dry adhesive layer, coating, or film and pressing the insulation product 502 against the surface 500 as described herein. A portion of the insulation product 502 has been peeled back to show that the bonded or adhered fibers remain coupled with the surface 500 even when the product is peeled away.

FIG. 5b illustrates an insulation product 514 bonded or adhered between studs 512 or joists of a wall 510, ceiling, or floor. The insulation product 514 includes facer 516 and may be adhered to the studs 512 via the self-stick adhesive coating, layer, or film of the flanges 518. Specifically, water may be applied to the flanges 518 so that the flange's adhesive coating forms a gel or viscous fluid and the flanges 518 may be pressed against the studs 512, or pressed between the studs so that the flanges 518 contact the inner stud walls, so that the flanges adhere thereto. In some embodiments, the sides and/or a top surface of the insulation product 514 may include an adhesive coating and may also adhere the insulation product 514 to the studs 512 and/or wall. In some embodiments, the studs 512 may be deeper than the insulation product 514 so that a cavity 520 is formed between a top surface of the insulation product 514 and the wall 510. The insulation product 514 may be pushed between the studs 512 to reduce or eliminate the cavity 520 if desired.

The self-stick adhesive allows the insulation product 514 to be coupled between the studs 512 without the use of clips, pins, staples, and the like. When the insulation product 514 is used in a crawl space or a ceiling, the self-stick adhesive may couple the insulation product 514 between joists 512 without using a lightning rod, which is typically used to hold the insulation product 514 in place. The self-stick adhesive greatly simplifies such processes because an installer may simply wet the flanges 518, and/or side or top surface, let the adhesive tack up for a few seconds, and then crawl underneath the joists 512, and press the insulation product 514 in position. The adhesive will then set up and hold the insulation product 514 in position.

The self-stick adhesive offers a similar advantage in coupling insulation products to steel studs, such as "C" channels. These studs are typically relatively slick, which causes the insulation batt to slide down. The self-stick adhesive may hold the insulation batt in position until sheetrock or other materials are coupled to the studs.

FIG. 5c illustrates an embodiment where an insulation product having the self-stick adhesive coating is applied to a garage door 530. Specifically, the insulation product 534 may be applied to panels of the garage door 530 between seams 532 in the manner described herein. The insulation product 534 effectively adheres to the garage door 530, which may be metal, wood, and the like. The insulation product 534 eliminates the need to use a "sticky pad on a pin" (i.e., a cap that adheres to the garage door and a pin that the insulation is pushed over), which is typically used to hold insulation in place on a garage door. The sticky pad on a pin attachment device tends to break loose over time because the cap is supporting a lot of weight. In contrast, the force is spread out over a much larger area using insulation product 534, which allows the insulation product 534 to remain adhered to the garage door.

Figure 6:
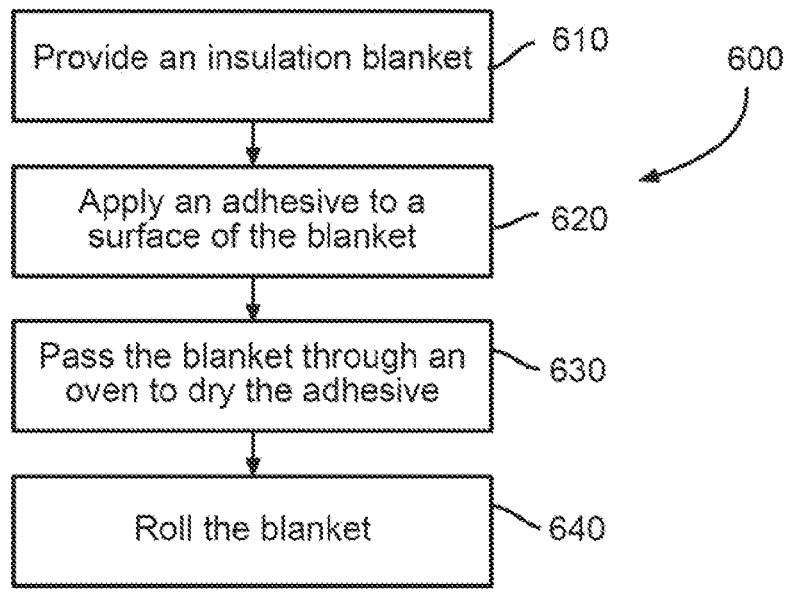
FIG. 6 illustrates a method of making a self-adhesive insulation blanket according to embodiments of the invention.

Referring now to FIG. 6, illustrated is a method 600 of making a self-adhesive insulation blanket. At block 610, an elongated fibrous insulation blanket is provided. As described herein, the fibrous insulation blanket has a length, a width, a thickness, and a first major surface and a second major surface which each extend for the length and width of the fibrous insulation blanket. At block 620, an adhesive is applied to the first major surface of the fibrous insulation blanket. The adhesive may include an emulsion of a polymer material and water. At block 630, the fibrous insulation blanket is passed through an oven so as to evaporate the water of the adhesive so that the adhesive forms a dry layer atop the first major surface. The adhesive may form a polymer matrix atop the first major surface, which is nonadherable or nonbondable to another object when in the dry state and re-adherable upon a subsequent application of water. At block 640, the fibrous insulation blanket may optionally be rolled to form a fibrous blanket roll product, which may be shipped to another facility for further processing and/or for installation.

In some embodiments, the oven that is used to dry the adhesive may have a temperature of 350 degrees Fahrenheit or less. In some embodiments, the oven may be an infrared oven or other type of oven. In some embodiments, the adhesive may be applied to the first major surface as a non-continuous and non-uniform coating, layer, or film atop the first major surface. In other embodiments, the adhesive may be applied to the first major surface to form a pattern of wavy lines (an S pattern), a pattern of straight lines, a pattern of crisscrossing lines, a pattern or orthogonal lines, a honeycomb pattern, a dot pattern, a splat pattern, and the like, atop the first major surface.

In some embodiments, the dry layer of adhesive may comprise between 0.1% and 10% of the fibrous insulation blanket by weight, although a range of between 2% and 8% is more common. In other embodiments, the dry layer of adhesive may comprise between 2% and 6%, between 3% and 5%, or about 3% to 4% of the fibrous insulation blanket by weight. In some embodiments, the amount of adhesive applied may depend on the application process. For example, continuous or relatively continuous adhesive coatings may have a dry layer of 8% or 10% by weight of the blanket while an S pattern application could comprise much less than 2% by weight of the blanket. In some embodiments, the dry adhesive layer may become re-adherable, or rebondable, to other objects upon application of water between about 15% and 30%, 15% and 25%, or about 20% by weight of the fibrous insulation blanket. In some embodiments, upon the subsequent application of water, the adhesive may have a tacky or working state that allows the fibrous insulation product to be repositioned with respect to an object that the adhesive is applied to. The adhesive may be in the tacky or working state for between 15 seconds and 2 minutes, less than 1 minute, about 30 seconds, and the like, subsequent to the application of water. The adhesive may change to the tacky or working state within 10 seconds, within 5 seconds, and the like upon the application of water. In some embodiments, a facer may be coupled to the second major surface of the fibrous insulation blanket. The adhesive may remain nonadherable or nonbondable even when subjected to a relative humidity of up to 100% and/or a temperature of 100 degrees Fahrenheit or more.

Figure 7:
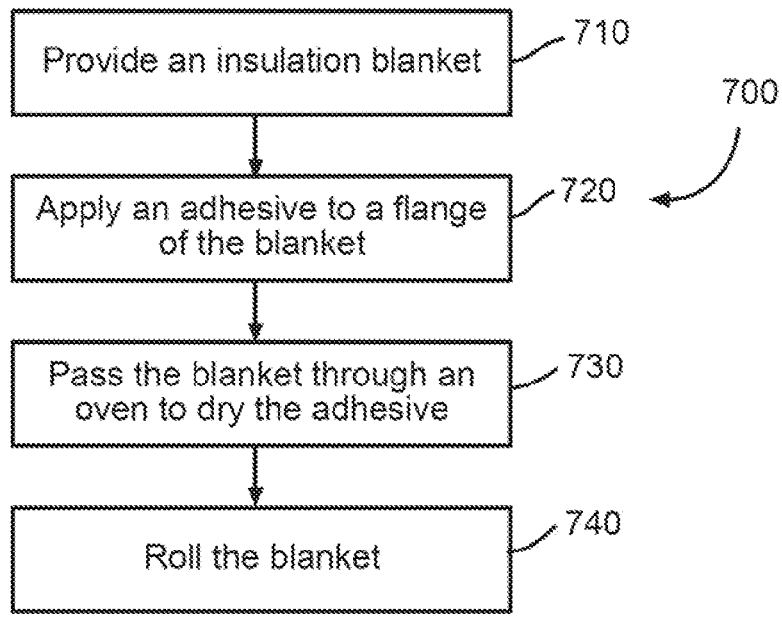
FIG. 7 illustrates another method of making a self-adhesive insulation blanket according to embodiments of the invention.

Referring now to FIG. 7, illustrated is a method 700 of making a self-adhesive insulation product. At block 710, a fibrous insulation blanket is provided. As described herein, the fibrous insulation blanket may have a length, a width, a thickness, a first and second major surface which each extend for the length and width of the fibrous insulation blanket, and a facer coupled with the first major surface. The facer may have a length approximately equal to the length of the fibrous insulation blanket and a width that is greater than the width of the insulation blanket so as to form flanges on opposing sides of the fibrous insulation blanket when coupled with the first major surface. In some embodiments a single flange may be created.

At block 720, an adhesive may be applied to the flanges of the facer. The adhesive may include an emulsion of a polymer material and water. At block 730, the fibrous insulation blanket and facer may be passed through an oven so as to evaporate the water of the adhesive applied to the flanges. Evaporation of the water may cause the adhesive to form a dry layer atop a surface of each flange. The adhesive may be nonadherable or nonbondable to other objects when in the dry state and re-adherable or rebondable to other objects upon an application of water. At block 740, the fibrous insulation blanket and facer may optionally be rolled to form a rolled insulation product.

In some embodiments, the self-adhesive insulation product may be installed or adhered to a wall, ceiling, or floor in accordance with the following steps: positioning the fibrous insulation blanket between two studs or joists, applying water to the adhesive so that the adhesive is re-adherable or rebondable, and pressing each flange against a respective stud or joist to adhere the flange thereto. In some embodiments, the adhesive may be applied over a substantial surface of the facer to bond the facer to the first major surface of the fibrous insulation blanket.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a self-adhesive insulation blanket comprising:
   providing an elongated fibrous insulation blanket, the fibrous insulation blanket having:
   a length;
   a width;
   a thickness; and
   a first major surface and a second major surface which each extend for the length and width of the fibrous insulation blanket;
   applying an adhesive to the first major surface of the fibrous insulation blanket, the adhesive comprising an emulsion of a polymer material and water;
   passing the fibrous insulation blanket or board product through an oven so as to evaporate the water of the adhesive such that the adhesive forms a dry layer atop the first major surface, the adhesive forming a polymer matrix atop the first major surface and being nonadherable when in the dry state and re-adherable upon a subsequent application of water; and
   rolling the fibrous insulation blanket to form a blanket roll.

2. The method of claim 1, wherein the oven comprises a temperature of 350 degrees Fahrenheit or less.

3. The method of claim 1, wherein the oven comprises an infrared oven.

4. The method of claim 1, wherein the adhesive is applied to the first major surface so as to form a non-continuous and non-uniform coating atop the first major surface.

5. The method of claim 1, wherein the adhesive is applied to the first major surface to form one or more of the following patterns atop the first major surface:
   a pattern of wavy lines (an S pattern);
   a pattern of straight lines;
   a pattern of crisscrossing lines;
   a pattern or orthogonal lines;
   a honeycomb pattern;
   a dot pattern; or
   a splat pattern.

6. The method of claim 1, wherein a weight of the dry layer of adhesive is between 2 and 8 percent of the weight of the fibrous insulation blanket.

7. The method of claim 1, wherein the dry adhesive layer becomes re-adherable upon application of water that is applied by between 15% and 30% of the weight of the fibrous insulation blanket.

8. The method of claim 1, wherein upon the subsequent application of water, the adhesive comprises a tacky state that allows the fibrous insulation blanked to be repositioned with respect to an object that the adhesive is applied to, the adhesive being in the tacky state for between 15 seconds and 2 minutes subsequent to the application of water.

9. The method of claim 1, further comprising coupling a facer to the second major surface of the fibrous insulation blanket.

10. The method of claim 1, wherein the adhesive remains nonadherable when subjected to a relative humidity of up to 100%.

11. A method of making a self-adhesive insulation product comprising:
    providing a fibrous insulation blanket or board product, the fibrous insulation blanket or board product having:
    a length;
    a width;
    a thickness;
    a first major surface and a second major surface which each extend for the length and width of the fibrous insulation blanket or board product; and
    a facer coupled with a second major surface, the facer having a length and a width approximately equal to the fibrous insulation blanket or board product;
    applying an adhesive to the first major surface of the fibrous insulation blanket or board product, the adhesive comprising an emulsion of a polymer material and water; and
    passing the fibrous insulation blanket or board product and facer through an oven so as to evaporate the water of the adhesive applied to the flanges so that the adhesive forms a dry layer atop the first major surface, the adhesive being nonadherable when in the dry state and re-adherable upon an application of water.

12. The method of claim 11, further comprising adhering the fibrous insulation blanket or board product to a wall, ceiling, or floor by:
    positioning the fibrous insulation blanket or board product adjacent a wall;
    applying water to the adhesive so that the adhesive is adherable; and
    pressing the first major surface against the wall a respective stud or joist to adhere the first major surface thereto.

13. The method of claim 11, wherein the adhesive is applied over a substantial surface of the first major surface.

14. The method of claim 11, wherein the self-adhesive insulation product is a fibrous insulation blanket and wherein the method further comprises rolling the fibrous insulation blanket and facer to form a rolled insulation product.

15. A method of making an insulation product comprising:
    providing an elongated fibrous insulation blanket or board product, the fibrous insulation blanket or board product-having:
    a length;
    a width;
    a thickness; and
    a first major surface and a second major surface which each extend for the length and width of the fibrous insulation blanket or board product;

applying an adhesive to the first major surface of the fibrous insulation blanket or board product so that, when dried, a weight of a dry layer of the adhesive is between 2 and 8 percent of the weight of the fibrous insulation blanket, the adhesive comprising an emulsion of a polymer material and water; and passing the fibrous insulation blanket or board product through an oven so as to evaporate the water of the adhesive and thereby form the dry layer of the adhesive atop the first major surface, the adhesive forming a polymer matrix atop the first major surface and being non-adherable when in the dry state and re-adherable upon a subsequent application of water.

16. The method of claim 15, wherein the adhesive is applied to the first major surface so as to form a non-continuous and non-uniform coating atop the first major surface.

17. The method of claim 15, wherein the dry adhesive layer becomes re-adherable upon application of water that is applied by between 15% and 30% of the weight of the fibrous insulation blanket or board product.

18. The method of claim 15, wherein upon the subsequent application of water, the adhesive becomes tacky for between 15 seconds and 2 minutes, which allows the fibrous insulation blanket or board product to be repositioned with respect to an object that the fibrous insulation blanket or board product is being adhered to.

* * * * *